Nov. 18, 1969   R. L. DAHLQUIST   3,478,750
CROP SEPARATOR
Filed Dec. 28, 1966
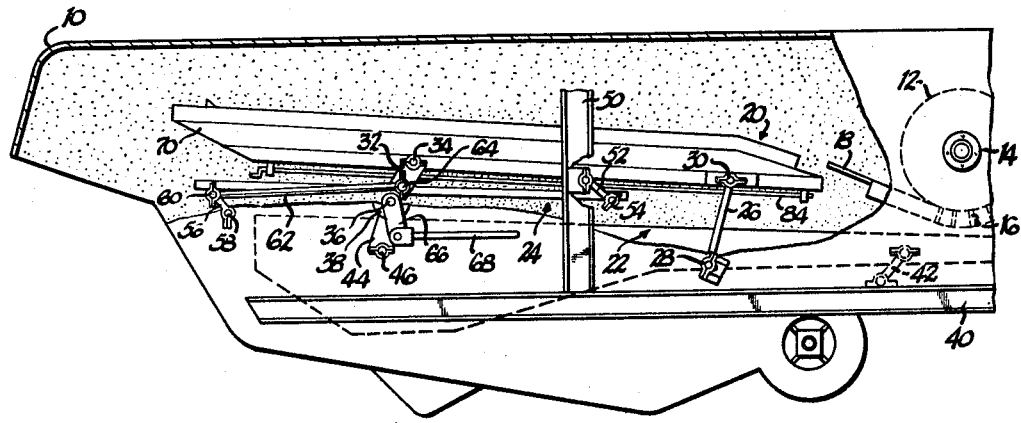
Fig. 1
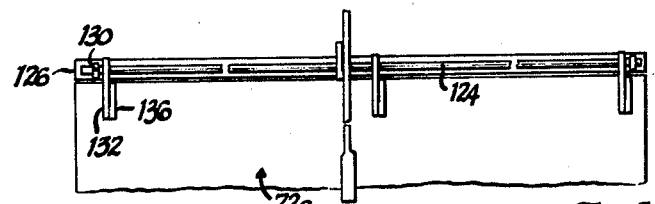
Fig. 5
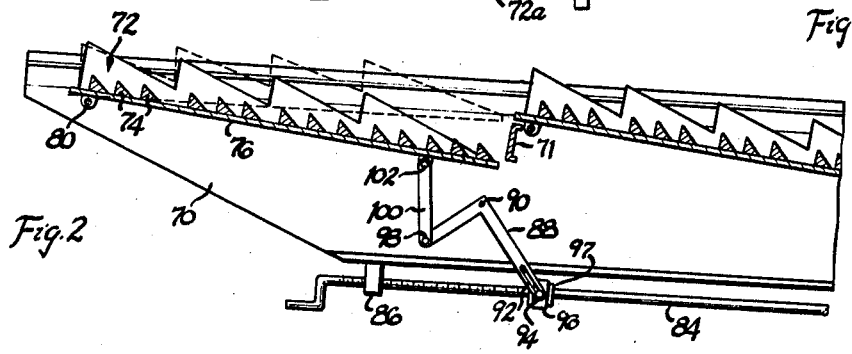
Fig. 2
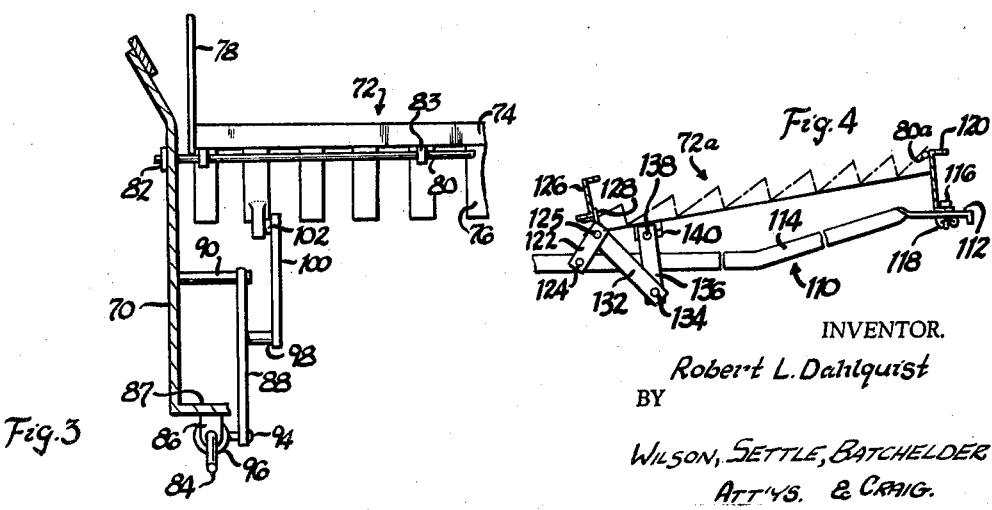
Fig. 3
Fig. 4
INVENTOR.
Robert L. Dahlquist
BY
WILSON, SETTLE, BATCHELDER
ATT'YS. & CRAIG.

United States Patent Office 3,478,750
Patented Nov. 18, 1969

3,478,750
CROP SEPARATOR
Robert L. Dahlquist, Rock Island, Ill., assignor to J. I.
Case Company, Racine, Wis., a corporation of Wisconsin
Filed Dec. 28, 1966, Ser. No. 605,349
Int. Cl. A01f 12/30
U.S. Cl. 130—26                                             6 Claims

ABSTRACT OF THE DISCLOSURE

This application relates to a harvesting machine including a crop separator having separating members the angle of which may be adjusted with respect to a support member to produce a more versatile machine.

---

The present invention relates generally to threshing machines and more particularly to improved mechanism for separating grain from straw.

In threshing machines, such as combines, the harvested material having the grain carried therein, is passed through a main threshing mechanism where the majority of the grain is separated from the remainder of the material. However, some of the grain remains in the harvested material, such as straw, which must be removed to achieve a maximum yield from the harvested crop. For this purpose, the straw, having some of the grain remaining therein, is passed over a crop separator commonly referred to as a strawrack or a straw-walker.

Separation of the grain from the straw is accomplished by agitating the crop separator to move the straw rearwardly on the separator and simultaneously separate the grain therefrom which falls through openings in grid sections carried by the separator. The straw finally passes over the rear end of the crop separator. The grid sections are usually arranged in angular relation within the crop separator to thereby increase the separation capacity of the crop separator.

Present day threshing machines, such as self-propelled combines, have been designed for increased versatility so as to be capable of harvesting various types of crops. However, it has been found that in harvesting heavy crops, such as corn, the materials tend to plug the grid openings so that grain cannot fall through the grid openings.

A primary object of the present invention is to provide an improved crop separator having greater versatility and efficiency than crop separators which have heretofore been utilized.

Another object is to provide improved crop separator which is capable of being effectively used for harvesting various types of crops.

Other objects and features of the present invention will become apparent by reference to the following specification and to the accompanying drawings wherein, FIG. 1 is a fragmentary side elevation of a threshing mechanism having the crop separator of the present invention incorporated therein;

FIG. 2 is an enlarged fragmentary vertical sectional view of the crop separator of the invention;

FIG. 3 is a fragmentary end view, partially in section of the crop separator shown in FIG. 2;

FIG. 4 is a side elevational view of a slightly modified control member; and

FIG. 5 is a fragmentary view of the bottom of the separator member and the connection of the control member shown in FIG. 4.

The crop separator of the present invention includes a pair of spaced side members having a plurality of grid sections or separating members pivotally connected intermediate the spaced side members. The free ends of the separating members are capable of being raised and lowered with respect to the side members by suitable moving means, which are illustratively shown as control members connected to the free ends of the separating members through linkage means.

With particular reference to the drawings, the threshing machine incorporating the invention is illustratively shown as including a housing 10 having a driven cylinder 12 supported for rotation in bearings 14 carried by the opposite sides of the housing 10. A concave 16 is suitably supported in close proximity to the cylinder 12 and has a plurality of bars or fingers forming a grate 18 directed to a region above a crop separator 20 of the present invention.

The harvested material passes between the cylinder 12 and concave 16, wherein the majority of the grain is separated from the remainder of the material and is received on a grain pan and cleaning shoe, generally designated as 22. The remainder of the harvested material is passed over the grate 18 onto the crop separator 20 upon which the threshed material is moved generally rearwardly while the grain remaining therein is separated from the harvested material and is gathered on a return pan 24.

The crop separator 20, return pan 24, and the grain pan and cleaning shoe 22 are driven in generally oscillating arcuate movements in several well known manners. One manner of moving the respective members is illustratively shown wherein the crop separator 20 is supported at its forward end by a pair of rocker arms 26 (one being shown) having one end pivoted at 28 on the housing 10 and the opposite end pivoted at 30 on the strawrack. A second pair of rocker arms 32 have one end pivoted at 34 adjacent the rear portion of the crop separator and the opposite ends of the rocker arms are fixed to a shaft 36, which extends transversely of the housing and is journalled in bearings 38 carried by the opposite sides of the housing 10.

The grain return pan and cleaning shoe 22 has its forward end supported above space beams 40, carried by the housing 10, through rocker arms 42 having one end journalled on the beams 40 and the opposite end journalled on the cleaning shoe 22. The rear portion of the cleaning shoe 22 is supported by a pair of rocker arms 44 having one end fixed to the shaft 36 and the opposite ends pivoted on the sides of the cleaning shoes at 46.

The return pan 24 has its forward end portion pivotally mounted on a vertically extending beam 50 through a pair of rocker arms 52 having one end pivoted on the beams 50 and the opposite end pivoted at 54 on the forward portion of the return pan 24. The rear of the grain pan 24 is supported through a pair of arms 56 having one end pivotally mounted on the sides of the housing 10 at 58 and the opposite ends pivoted at 60 to the return pan 24. A driving arm 62 has one end pivotally connected to the pivot point 60 and the opposite end connected to a pivot point 64 carried by the rocker arm 32. A crank 66 is connected to the shaft 36 and has a rod 68 connected to the free end thereof which is moved back-and-forth by any conventional mechanism connected to the power source (not shown) of the harvesting machine. For a more detailed description of the illustrated oscillating means for moving the strawrack 20, cleaning shoe 22 and return pan 24, reference may be had to Patent No. 3,109,434 issued to J. L. Strever on Nov. 5, 1963.

As indicated above, crop separators are commonly provided with a plurality of grid sections which are disposed at an angle with respect to the side members and arranged to form a stepped-grid arrangement thereby increasing the separation capacity of the crop separator. However, in harvesting certain heavy crops this arrangement produced a tendency to plug the grid openings with the heavy materials thereby rendering these grid openings ineffective in separating the grain from the remainder of the material.

According to the invention, a crop separator is provided with means for varying the vertical spacing of the adjacent ends of the several grid sections. This is accomplished by pivotally mounting one end of each grid section on the spaced side members and providing means connected to the opposite or free end of each grid section to thereby raise and lower the free ends of the grid sections. Although the inventive features of the crop separator are described in connection with a strawrack, the inventive features are equally capable of being incorporated in a crop separator consisting of a plurality of walker sections.

The crop separator of the present invention includes a pair of spaced side members 70 interconnected by rigid cross-members 71 and supporting a plurality of separating members 72. The separating members or grid sections 72 each include a series of transversely disposed boards 74, which are illustratively shown as being triangular in cross section. The boards 74 are supported in spaced relation to each other upon a plurality of longitudinally disposed boards 76. Preferably longitudinally disposed toothed plates 78 are spaced transversely on the crop separator and extend above the cross-boards 74 which will keep the crop distributed on the separating members by minimizing the bunching of a crop to one side of the rack and at the same time assist in the movement of the crop rearwardly along the crop separator. The rigid cross-members 71 prevent the crop or straw from passing between openings formed between adjacent separating members.

The rear ends of each of the separating members 72 are pivotally supported on a rod 80 having its opposite ends journalled in bearings 82 carried by the side members 70, with the rods fixed at spaced points to the grid sections 72 through lugs 83. The free ends of each of the separating members are mounted for movement about an axis formed by the rods 80. In the illustrated embodiment, the moving means includes a control rod 84 supported in threaded openings of spaced brackets 86 secured to inwardly directed flanges 87 extending from the lower edge of one of the side members 70.

The control rod 84 is connected to the free end of the separating member 72, by linkage means which includes a generally L-shaped member 88 pivoted on a pin 90 which is fixed to the inner surface of the side member 70. One end of the L-shaped member is provided with an elongated slot 92 which receives a pin 94 carried by a collar 96 rotatable on the rod 84. The collar is held in a fixed axial position on the rod 84 by members 97 secured to the rod and engaging the opposite surfaces of the the collar. The opposite free end of the L-shaped member 88 is pivotally connected by a pin 98 to one end of an arm 100. The opposite end of the arm 100 is pivotally connected to the free end of the separator member 72 by a pin 102 fixedly secured to one of the boards 76.

In operation, rotation of the rod 84 in the appropriate direction will raise the respective free ends of each of the separating members from the solid line position to the dotted line position shown in FIGURE 2. Of course, the crop separating members 72 may be fixed in any position intermediate the two positions shown in FIGURE 2 and suitable lock means (not shown) may be provided for keeping the control rod locked in a desired position.

If desired, the control rod may be driven by the power source (not shown) driving the threshing mechanism with appropriate mechanical interconnections (not shown) interposed between the control rod and the power source. Furthermore, two control rods may be carried by the respective side members and connected to each side of the respective side members both of which may be hand or power operated. Also, it is considered within the spirit of the invention to provide individual control rods for each of the separating members so that each member may be individually controlled.

A slightly modified form of moving means is shown in FIGURES 4 and 5. The modified moving means includes a control member or rod 110 having a horizontally disposed portion 112 and a vertically disposed portion 114 formed by twisting the end portion of the control member or strip 110 through an arc of 90°. The horizontal portion 112 is provided with an elongated slot (not shown) for receiving the shank portion of a bolt 116 having a wing nut 118 to releasably secure the end of the control member 110 to a transversely disposed channel 120 carried by the combine housing.

A link 122 has one end pivotally secured at 124 to the vertical portion 114 of the control member 110. The opposite end of the link 122 is secured, as by welding, to a transverse rod rotatably supported on a cross member 126 through a bracket 128 and a bearing member 130. A second link 132 has one end secured to the rod or shaft 124 and the opposite end pivotally secured through pin 134 to a third link 136. The free end of the third link is pivotally secured at 138 on a lug 140 carried by the lower surface of the separator member 72a. As shown in FIGURE 5, three pairs of links 132, 136 are provided at spaced points to interconnect the pivot shaft 124 to the separator member 72a.

The operation of the modified control means is substantially identical to the control means shown in FIGURES 1 through 3. Thus, by loosening the wing nut 118 the control member 110 can be moved longitudinally of the separator member thereby pivoting the shaft 124 on the spaced bearings 130 to raise or lower the free end of the separator members 72a. By tightening the wing nut 118 the separator member 72a may be maintained in a fixed position at any point between the raised and lowered positions.

While an illustrative form of structure has been disclosed it will be apparent to those skilled in the art that the illustrated embodiment may readily be modified. Therefore, the foregoing description is to be considered exemplary rather than limiting, and the true scope of the invention is that defined by the following claims.

I claim:

1. A crop separator for a threshing machine comprising a pair of spaced side members, a plurality of separating members, hinge means connecting one end of each of said separating members to said side members, and moving means carried by at least one of said side members and connected to each of said separating members for raising and lowering the free ends of said separating members to thereby vary the inclination of said separating members with respect to said side members, said separating members being disposed transversely between said side members with the respective hinge means spaced longitudinally on said side members and said moving means being operative to rotate the separating members from inclined planes wherein the separating members are in stepped configuration to a position wherein the separating members are in a common plane.

2. A crop separator as defined in claim 1, wherein said moving means includes a shaft rotatably journaled on said side member and linkage means interconnecting said shaft and said separating members.

3. A crop separator as defined in claim 1, wherein said moving means includes a movable member carried by one of said side members and linkage means interconnecting the movable member with said separating members, said linkage means adapted to raise or lower the free ends of the separating members upon movement of said movable member in the appropriate direction.

4. A crop separator as defined in claim 1, in which said moving means includes a control member having a horizontal portion and a vertical portion, linkage means interconnecting the free ends of said separated members to said vertical portion, and releasable means securing said horizontal portion to said machine.

5. A crop separator as defined in claim 4, in which said linkage means includes a shaft rotated in response to movement of said control member, and means interconnecting said shaft and the free end of said separating members whereby rotation of said shaft will raise or lower the free end of said separating member.

6. In a harvesting machine, a crop separator comprising a pair of longitudinally extending and transversely spaced side members, a plurality of separating members disposed between said side members and located in substantially end to end relation longitudinally of said side members, means carried by said side members defining transversely extending pivot axes for respective ones of said separating members with one end of separate ones of said separating members pivotally secured to the respective pivot axes, and moving means interposed between the opposite ends of the respective separating members and said side members for raising and lowering said opposite ends of said separating members to pivot said separating members about said pivot axes and vary the longitudinal inclination of said separating members with respect to said side members.

References Cited

UNITED STATES PATENTS

| 617,116   | 1/1899  | McDaniels | 130—26 |
| 871,566   | 11/1907 | Chipera   | 130—26 |
| 1,175,088 | 4/1916  | Storzuk   | 130—26 |

ANTONIO F. GUIDA, Primary Examiner